United States Patent [19]
Schultz

[11] Patent Number: 5,889,977
[45] Date of Patent: Mar. 30, 1999

[54] METHOD AND APPARATUS FOR ENSURING FEATURE COMPATABILITY AND COMMUNICATING FEATURE SETTINGS BETWEEN PROCESSORS AND MOTHERBOARDS

[75] Inventor: Nathan Schultz, Portland, Oreg.

[73] Assignee: Intel Corporation, Santa Clara, Calif.

[21] Appl. No.: 766,728

[22] Filed: Dec. 13, 1996

[51] Int. Cl.$^6$ .................................................. G06F 13/36
[52] U.S. Cl. .................... 395/500; 395/306; 395/281; 395/282
[58] Field of Search .................... 395/500, 280, 395/281, 282, 283, 527, 834, 306, 308

[56] References Cited

U.S. PATENT DOCUMENTS

| | | | |
|---|---|---|---|
| 5,321,827 | 6/1994 | Lu et al. ................................. | 395/500 |
| 5,325,490 | 6/1994 | Brasseur ................................. | 395/325 |
| 5,517,626 | 5/1996 | Archer et al. .......................... | 395/290 |
| 5,555,381 | 9/1996 | Ludwig et al. ........................ | 395/281 |
| 5,586,270 | 12/1996 | Rotier et al. ............................ | 395/282 |
| 5,659,680 | 8/1997 | Cunningham et al. ............ | 395/183.01 |
| 5,734,841 | 3/1998 | Shin et al. .............................. | 395/282 |

*Primary Examiner*—Kevin J. Teska
*Assistant Examiner*—Thai Phan
*Attorney, Agent, or Firm*—Blakely, Sokoloff, Taylor & Zafman LLP

[57] ABSTRACT

A handshake mechanism is provided to allow feature compatible processor and motherboard combinations to operate, and incompatible combinations to fail safely. The handshake mechanism also facilitates communication of feature settings between a motherboard and an attached processor. For each feature, the handshake mechanism includes connection pins correspondingly disposed on complementary connectors of the processors and the motherboards for conveying a feature setting selection signal for the feature. The handshake mechanism further includes particular manners for connecting the processors' connection pins and the motherboards' connection pins to their respective internal circuitry, depending on the manners the feature is supported by the various processors and motherboards.

33 Claims, 1 Drawing Sheet

METHOD AND APPARATUS FOR ENSURING FEATURE COMPATABILITY AND COMMUNICATING FEATURE SETTINGS BETWEEN PROCESSORS AND MOTHERBOARDS

BACKGROUND OF THE INVENTION

1. Field of the Invention

The present invention relates to the field of computer systems. More specifically, the present invention relates to the art of ensuring feature and communicating feature settings between processors and motherboards.

2. Background Information

Microprocessors and related device technologies are continuing to advance at an ever increasing pace. From the processor and device manufacturers' perspective, the marketplace must be able to absorb these advances in technology as advancements are made. One hurdle to this absorption is the worry of equipment obsolescence. Before making investments into equipment, businesses and consumers want to know that there are migration paths for them to upgrade in an orderly manner, and preferably at times that are most advantages for them (driven by their needs, and not "forced" upon them by the equipment manufacturers). Thus, compatibility between different generations of components/equipment is an important goal to strive for. The increasing pace of technological advancement has made the achievement of this goal even more important.

Conventionally, different sockets, slots, form factors, and/or mechanical keying are employed to ensure that only compatible processors and devices will be used together. Additionally, manual "switches", such as jumpers would be employed to indicate the features and/or feature settings supported. These conventional approaches to ensure compatibility and communicate features/feature settings suffer a number of disadvantages. First, approaches that use different sockets, etc. are costly. Multiple parts have to be manufactured, maintained, and tracked. Second, approaches that use manual "switches" are error-prone. Thus, a more cost effective and less error-prone approach to ensure feature compatibility and communicate feature settings between processors and motherboards is needed.

SUMMARY OF THE INVENTION

A handshake mechanism is provided to allow feature compatible processor and motherboard combinations to operate, and incompatible combinations to fail safely. The handshake mechanism also facilitates communication of feature settings between a motherboard and an attached processor. For each feature, the handshake mechanism includes connection pins correspondingly disposed on complementary connectors of the processors and the motherboards for conveying a feature setting selection signal for the feature. The handshake mechanism further includes particular manners for connecting the processors' connection pins and the motherboards' connection pins to their respective internal circuitry, depending on the manners the feature is supported by the various processors and motherboards.

In one embodiment, the feature is system bus speed, including a first and a second bus speed setting. The feature setting selection signal is a bus speed selection signal having a low and a high state, with the low state selecting the first bus speed setting, and the high state selecting the second bus speed setting.

For this embodiment, for processors that invariantly support only the first bus speed setting, their connection pins are connected to ground to drive the bus speed selection signals to the low state. For processors that variantly support either one of the bus speed settings, their connection pins are connected to pull-up resistors to pull the bus speed selection signals to the high state.

For motherboards that invariantly support only the first bus speed setting, their connection pins are connected to ground to drive the bus speed selection signals in the low state. For motherboards that variantly support either one of the bus speed settings, their connection pins are coupled to the clock select inputs of the variable system clocks on the motherboards, to provide the variable system clocks with the bus speed selection signals. For motherboards that invariantly support the second bus speed setting, their connection pins are connected to the reset signal lines of the motherboards, to allow the low state feature setting selection signals to trigger resets.

Thus, a processor that invariantly supports the first bus speed setting, regardless of whether the processor has a processor core that monitors the feature selection signal to determine whether the first or the second bus speed setting is being selected, will operate with either a motherboard that invariantly supports only the first bus speed setting or a motherboard that variantly supports either one of the bus speed settings, when attached to such a motherboard. This processor will fail safely when attached to a motherboard that invariantly supports only the second bus speed setting.

Additionally, a processor that variantly supports either one of the bus speed settings will operate with any one of the three types of motherboards, i.e. motherboards that invariantly support only the first bus speed setting, motherboards that variantly support either one of the bus speed settings, and motherboards that invariantly support only the second bus speed setting. When attached to a motherboard that variantly supports either one of the bus speed settings, the combination operates with the second bus speed setting.

BRIEF DESCRIPTION OF DRAWINGS

The present invention will be described by way of exemplary embodiments, but not limitations, illustrated in the accompanying drawing in which like references denote similar elements, and in which.

DETAILED DESCRIPTION OF THE INVENTION

Figure 1:
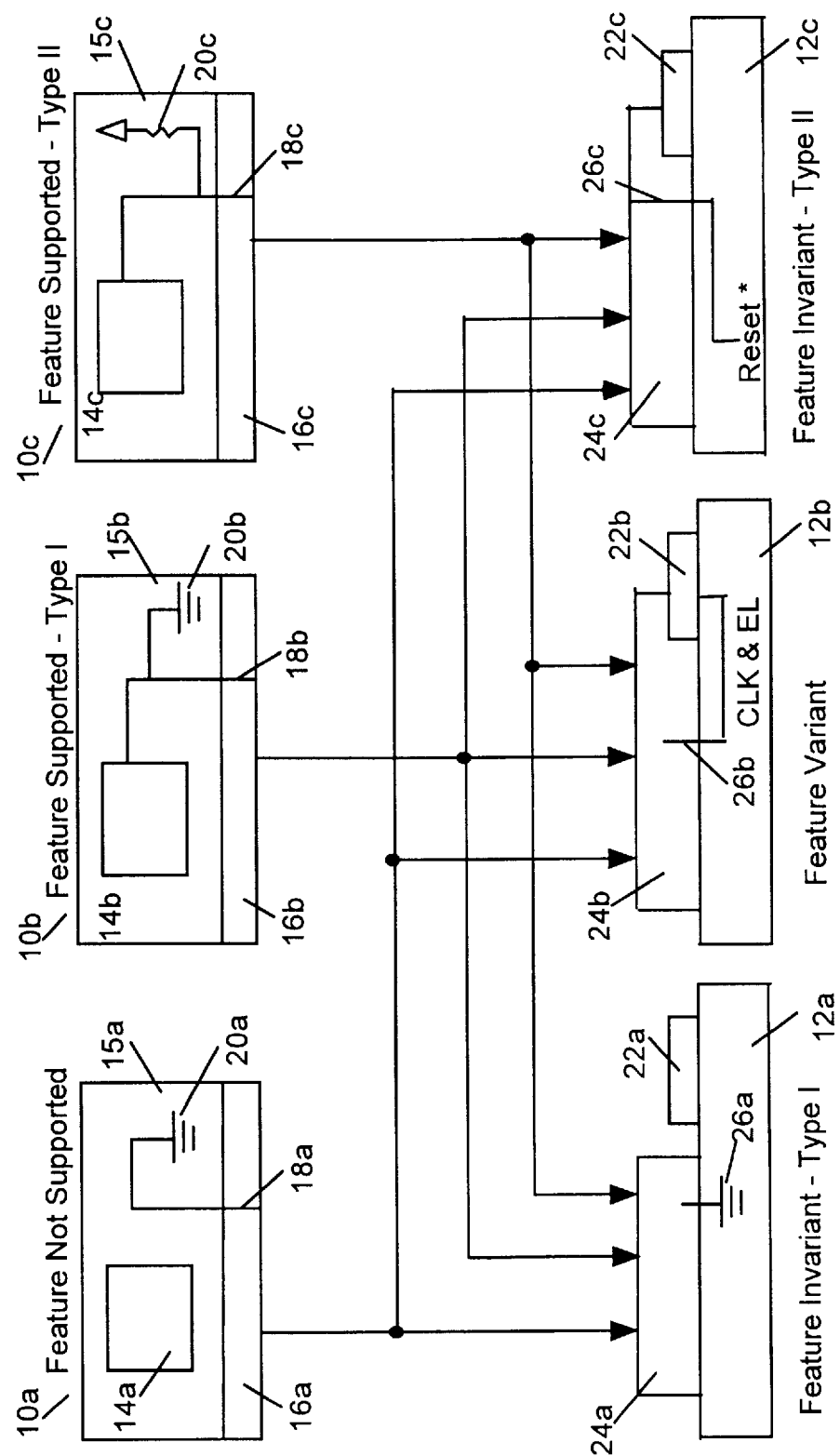
FIG. 1 illustrates one embodiment of the present invention for providing feature compatibility between processors and motherboards.

In the following description, various aspects of the present invention will be described. However, it will be apparent to those skilled in the art that the present invention may be practiced with only some or all aspects of the present invention. For purposes of explanation, specific numbers and configurations are set forth in order to provide a thorough understanding of the present invention. However, it will also be apparent to one skilled in the art that the present invention may be practiced without the specific details. In other instances, well known features are omitted or simplified for clarity.

Referring now to FIG. 1, wherein three exemplary processors 10a–10c and three exemplary motherboards 12a–12c are shown. Exemplary processors 10a–10c and exemplary motherboards 12a–12c are equipped to be feature compatible for an exemplary system bus speed feature in accordance with the present invention. In other words, any one of exemplary processors 10a–10c may be attached to any one of exemplary motherboards 12a–12c, notwithstanding their differences in the manner in which the system bus speed feature is supported. In combinations that are compatible, the attached processors 10a, 10b, or 10c and motherboards 12a, 12b or 12c will operate with each other, and in combinations that are incompatible, the combinations will be allowed to fail safely. No manual intervention, switches, or jumpers are required, as they are in the prior art.

The exemplary system bus speed feature includes a first exemplary system bus speed feature setting of 66 MHz and a second exemplary system bus speed feature setting of 100 MHz. A bus speed selection signal having a low state and a high state is employed to select the bus speed settings, with the low state selecting the 66 MHz bus speed, and the high state selecting the 100 MHz bus speed.

For the illustrated embodiment, processors 10a, 10b, and 10c include processor cards 15a, 15b, and 15c having processor cores 14a, 14b, and 14c attached thereon respectively. Processor core 14a invariantly supports the system bus speed feature at 66 MHz. Furthermore, processor core 14a does not monitor the bus speed selection signal to confirm that indeed the 66 MHz system bus speed is the appropriate system bus speed to be employed. Processor cores 14b and 14c variantly support either the 66 MHz or the 100 MHz system bus speed. Moreover, processor cores 14b and 14c support monitoring of the bus speed select signal to determine whether the 66 MHz or the 100 MHz bus speed is to be employed. However, for one or more design/packaging reasons[1], processor 10b is to be packaged to invariantly support the 66 MHz system bus speed. The impact of this design/packaging consideration will be explained more fully below.

[1] The exact nature of the reasons are unimportant.

Each of processor cards 15a–15c includes an identical male edge connector 16a–16c having a system bus speed selection pin 18a–18c for conveying the bus speed selection signal, even though processor core 14a supports the system bus speed feature in an invariant manner, and does not monitor the signal.

Accordingly, pin 18a is not coupled to processor core 14a, while pins 18b and 18c are coupled to processor cores 14b and 14c respectively. Additionally, in accordance with the present invention, pin 18a is coupled to ground 20a to drive the bus speed selection signal to the low state. Similarly, in view of the design/packaging consideration, pin 18b is further coupled to ground 20b to drive the bus speed selection to the low state. Pin 18c is further coupled to pull-up resistor 20c to pull the bus speed selection signal to the high state. The purpose of these additional couplings will be explained in more detail below.

Motherboards 12a and 12c invariantly support the system bus speed feature at 66 MHz and 100 MHz respectively, whereas motherboard 12b variantly supports the system bus speed feature at either 66 MHz or at 100 MHz. Motherboard 12b includes variable clock 22b that is equipped to generate clock pulses for the system bus at either 66 MHz or at 100 MHz.

Each of motherboards 12a–12c includes an identical female edge connector 24a–24c, having a system bus speed selection pin 26a–26b, even though motherboard 12a and 12c support the system bus speed feature in an invariant manner. Since female edge connectors 24a–24c are identical, and so are male edge connectors 16a–16c, each of processor 10a–10c may be attached to any of motherboards 12a–12c.

System bus speed selection pins 26a–26b of female edge connectors 24a–24c correspond to system bus speed selection pins 18a–18c of male edge connectors 16a–16c. In accordance with the present invention, pin 26a of motherboard 12a is coupled to ground to drive the bus speed selection signal to the low state, while pin 26b of motherboard 12b is coupled to variable clock 22b to provide the bus speed selection signal as a clock select signal to variable clock 22b. Pin 26c is coupled to a reset signal line with a low state control signal (RESET#) on the reset signal line denoting a reset state for motherboard 12c, thereby allowing a low state bus speed selection signal to trigger a reset.

Thus, when processor 10a (which invariantly supports the system bus speed feature at 66 MHz, with its processor core 14a operating independent of the system bus selection signal) is attached to motherboard 12a (which also invariantly supports the system bus speed feature at 66 MHz), the combination will operate with the system bus speed of 66 MHz as expected. For this combination, the state of the bus speed selection signal is immaterial, as both processor 10a and motherboard 12a operate independent of the bus speed selection signal. However, the bus speed selection signal is driven to the low state by both processor 10a and motherboard 12a.

When processor 10a is attached to motherboard 12b (which variantly supports the system bus speed feature at either 66 MHz or 100 MHz), the combination will also operate with the 66 MHz system bus speed. By advantageously grounding pin 18a of processor 10a, the system bus selection signal is driven to the low state. The low state system bus selection signal is in turn conveyed to variable clock 22b, selecting the 66 MHz system bus speed.

Furthermore, when processor 10a is attached to motherboard 12c (which invariantly supports the system bus speed feature at 100 MHz), the combination will fail safely. By advantageously grounding pin 18a, the bus selection signal is driven to the low state. The low state bus selection signal is conveyed to the reset signal line, triggering a reset for motherboard 12c, and holding motherboard 12c in the reset state.

When processor 10b (which invariantly supports the system bus speed feature at 66 MHz, with its processor core 10b monitoring the system bus speed selection signal) is attached to motherboard 12a (which invariantly supports the system bus speed feature at 66 MHz), the combination will properly operate with the 66 MHz system bus speed. The bus speed selection signal is driven to the low state by both processor 10b and motherboard 12a, selecting the 66 MHz system bus speed.

When processor 10b is attached to motherboard 12b (which variantly supports the system bus speed feature at either 66 MHz or 100 MHz), the combination will operate with the 66 MHz system bus speed, as expected. The bus speed selection signal is driven to the low state by processor 10b and conveyed to variable clock 22b, selecting the 66 MHz system bus speed.

When processor 10b is attached to motherboard 12c (which invariantly supports the system bus speed feature at 100 MHz), the combination will fail safely, as in the combination of processor 10a and motherboard 12c. By advantageously grounding pin 18a, the bus selection signal is driven to the low state. The low state bus selection signal is in turn conveyed to the reset signal line, triggering a reset for motherboard 12c, and holding motherboard 12c in the reset state.

When processor 10c (which variantly supports the system bus speed at either 66 MHz or 100 MHz, with its processor core 14c monitoring the system bus selection signal) is attached to motherboard 12a (which invariantly supports the system bus speed feature at 66 MHz), the combination will properly operate with the 66 MHz system bus speed, due to the grounding of pin 26a. Motherboard 12a drives the bus selection signal to the low state, selecting the 66 MHz system bus speed for processor 10c.

When processor 10c is attached to motherboard 12b (which variantly supports the system bus speed feature at either 66 MHz or 100 MHz), the combination will operate with the 100 MHz system bus speed, as expected. By advantageously coupling pin 18c to pull-up resistor 20c, processor 10c pulls the bus speed selection signal to the high state. The high state bus speed selection signal is in turn conveyed to variable clock 22b, selecting the 100 MHz system bus speed.

Finally, when processor 10c is attached to motherboard 12c (which invariantly supports the system bus speed feature at 100 MHz), the combination will properly operate with the 100 MHz system bus speed, since the reset state of motherboard 12c is unaffected by the high state system bus selection signal, which was pulled high by virtue of pin 18c being advantageously connected to pull-up resistor 20c. However, if appropriate, motherboard 12c may assert RESET# to place itself in the reset state.

In summary, by virtue of the present invention, any one of processors 10a–10c can be attached to any one of motherboards 12a–12c. Those combinations designed to work with each other will work as expected. The incompatible combinations will fail safely. None of the above desirable results require special sockets, special slots, special form factors, keys, manual intervention, switches and/or jumpers, as would be required by the prior art.

While the feature compatibility of the present invention has been described in terms of the above illustrated embodiment, those skilled in the art will recognize that the invention is not limited to the embodiment described. The present invention can be practiced with modification and alteration within the spirit and scope of the appended claims. In particular, the present invention may be practiced with other features and/or feature settings. Particular examples of other features include but are not limited to transaction protocols, timing parameters, and architectural attributes. Accordingly, the description is to be regarded as illustrative instead of restrictive on the present invention.

Thus, a method and apparatus for ensuring feature compatibility and communicating feature settings between processors and motherboards has been described.

What is claimed is:

1. An apparatus comprising:
   (a) a motherboard having a first pin for conveying a feature setting selection signal for a feature, wherein the first pin is connected to internal circuitry of the motherboard in a manner that is dependent on how the feature is supported by the motherboard; and
   (b) a processor attached to the motherboard, the processor having a second pin corresponding to the first pin for conveying the feature setting selection signal, wherein the second pin is connected to internal circuitry of the processor in a manner that is dependent on how the feature is supported by the processor,
   said support dependent manners of pin connections being complementary to allow the apparatus to operate if the processor and the motherboard support the feature in a compatible manner, and to fail safely if the processor and the motherboard support the feature in an incompatible manner.

2. The apparatus as set forth in claim 1, wherein the feature includes a first and a second feature setting, and the feature setting selection signal has a low and a high state for selecting the first and the second feature settings respectively.

3. The apparatus as set forth in claim 2, wherein
   the processor has a processor core that invariantly supports the feature at the first feature setting, and operates independent of the feature setting selection signal, and
   the second pin is exclusively connected to ground to drive the feature setting selection signal to the low state.

4. The apparatus as set forth in claim 3, wherein
   the motherboard invariantly supports the feature at the first feature setting; and
   the first pin is connected to ground to drive the feature setting selection signal to the low state, allowing the processor to operate with the motherboard at the first feature setting.

5. The apparatus as set forth in claim 3, wherein
   the motherboard variantly supports the feature at either the first or the second feature setting; and
   the first pin is connected to a feature select input on the motherboard for the feature, allowing the processor to operate with the motherboard at the first feature setting.

6. The apparatus as set forth in claim 2, wherein
   the processor has a processor core that variantly supports the feature at either the first or the second feature setting, and the processor core monitors the feature setting selection signal, and
   the second pin is connected to the processor core and to ground to drive the feature setting selection signal to the low state.

7. The apparatus as set forth in claim 6, wherein
   the motherboard invariantly supports the feature at the first feature setting; and
   the first pin is connected to ground to drive the feature setting selection signal to the low state, allowing the processor to operate with the motherboard at the first feature setting.

8. The apparatus as set forth in claim 6, wherein
   the motherboard variantly supports the feature at either the first or the second feature setting; and
   the first pin is connected to a feature select input on the motherboard for the feature, allowing the processor to operate with the motherboard at the first feature setting.

9. The apparatus as set forth in claim 2, wherein
   the processor has a processor core that variantly supports the feature at either the first or the second feature setting, and the processor core monitors the feature setting selection signal, and
   the second pin is connected to the processor core and to a pull-up resistor to pull the feature setting selection signal to the high state.

10. The apparatus as set forth in claim 9, wherein
    the motherboard invariantly supports the feature at the first feature setting; and
    the first pin is connected to ground to drive the feature setting selection signal to the low state, allowing the processor to operate with the motherboard at the first feature setting.

11. The apparatus as set forth in claim 9, wherein
    the motherboard variantly supports the feature at either the first or the second feature setting; and
    the first pin is connected to a feature select input on the motherboard for the feature, allowing the processor to operate with the motherboard at the second feature setting.

12. The apparatus as set forth in claim 9, wherein the motherboard invariantly supports the feature at the second feature setting; and the first pin is connected to a reset signal line of the motherboard, wherein a low state signal on the reset signal line denotes a reset state of the motherboard, allowing the processor to operate with the motherboard at the second feature setting, and allowing the motherboard to fail safely in the event the processor is replaced by an incompatible processor, which invariantly supports the feature at the first feature setting instead.

13. The apparatus as set forth in claim 2, wherein the motherboard invariantly supports the feature at the first feature setting; and the first pin is connected to ground to drive the feature setting selection signal to the low state.

14. The apparatus as set forth in claim 2, wherein the motherboard variantly supports the feature at either the first or the second feature setting; and the first pin is connected to a feature select input on the motherboard for the feature.

15. The apparatus as set forth in claim 2, wherein the motherboard invariantly supports the feature at the second feature setting; and the first pin is connected to a reset signal line of the motherboard, wherein a low state signal on the reset signal line denotes a reset state of the motherboard.

16. The apparatus as set forth in claim 1, wherein the feature is system bus speed, including a first and a second bus speed, and the feature setting selection signal is a bus speed selection signal having a low and a high state for selecting the first and the second bus speeds respectively.

17. A method for ensuring feature compatibility and communicating feature settings between processors and motherboards, the method comprising the steps of:

(a) connecting a first pin of a processor to internal circuitry of the processor in a manner dependent on how the processor supports a feature;

(b) connecting a second pin of a motherboard to internal circuitry of the motherboard in a manner dependent on how the motherboard supports the feature, said support dependent manners of pin connections being complementary to each other; and (c) attaching the processor to the motherboard, thereby allowing the processor and the motherboard to operate with each other if they support the feature in a compatible manner, and allowing the processor and the motherboard to fail safely if they support the feature in an incompatible manner.

18. The method as set forth in claim 17, wherein the feature includes a first and a second feature setting, and the feature setting selection signal includes a low and a high state for selecting the first and the second feature setting respectively.

19. The method as set forth in claim 18, wherein the processor has a processor core that invariantly supports the feature at the first feature setting, and operates independent of the feature setting selection signal, and step (a) comprises connecting the first pin exclusively to ground to drive the feature setting selection signal to the low state.

20. The method as set forth in claim 19, wherein the motherboard invariantly supports the feature at the first feature setting; and step (b) comprises connecting the second pin to ground to drive the feature setting selection signal to the low state.

21. The method as set forth in claim 19, wherein the motherboard variantly supports the feature at either the first or the second feature setting; and step (b) comprises connecting the second pin to a feature select input of on the motherboard for the feature.

22. The method as set forth in claim 18, wherein the processor has a processor core that variantly supports the feature at either the first or the second feature setting, and the processor core monitors the feature setting selection signal, and step (a) comprises connecting the first pin to the processor core and to ground to drive the feature setting selection signal to the low state.

23. The method as set forth in claim 22, wherein the motherboard invariantly supports the feature at the first feature setting; and step (b) comprises connecting the second pin to ground to drive the feature setting selection signal to the low state.

24. The method as set forth in claim 22, wherein the motherboard variantly supports the feature at either the first or the second feature setting; and step (b) comprises connecting the second pin to a feature select input on the motherboard for the feature.

25. The method as set forth in claim 18, wherein the processor has a processor core that variantly supports the feature at either the first or the second feature setting, and the processor core monitors the feature setting selection signal, and step (a) comprises connecting the first pin to the processor core and to a pull-up resistor to pull the feature setting selection signal to the high state.

26. The method as set forth in claim 25, wherein the motherboard invariantly supports the feature at the first feature setting; and step (a) comprises connecting the second pin to ground to drive the feature setting selection signal to the low state.

27. The method as set forth in claim 25, wherein the motherboard variantly supports the feature at either the first or the second feature setting; and step (b) comprises connecting the second pin to a feature select input on the motherboard for the feature.

28. The method as set forth in claim 25, wherein the motherboard invariantly supports the feature at the second feature setting; and step (b) comprises connecting the second pin to a reset signal line of the motherboard, wherein a low state signal on the reset signal line denotes a reset state of the motherboard, allowing the processor to operate with the motherboard at the second feature setting, and allowing the motherboard to fail safely in the event the processor is replaced by an incompatible processor, which invariantly supports the feature at the first feature setting instead.

29. The method as set forth in claim 17, wherein the motherboard invariantly supports the feature at the first feature setting; and step (b) comprises connecting the second pin to ground to drive the feature setting selection signal to the low state.

30. The method as set forth in claim 17, wherein the motherboard variantly supports the feature at either the first or the second feature setting; and step (b) comprises connecting the second pin to a feature select input on the motherboard for the feature.

31. The method as set forth in claim 17, wherein the motherboard invariantly supports the feature at the second feature setting; and step (b) comprises connecting the second pin to a reset signal line of the motherboard, wherein a low state signal on the reset signal line denotes a reset state of the motherboard.

32. The method as set forth in claim 17, wherein the feature is system bus speed, including a first and a second bus speed, and the feature setting selection signal is a bus speed selection signal having a low and a high state for selecting the first and the second bus speeds respectively.

33. A motherboard comprising:

(a) a feature invariantly supported at a first feature setting;

(b) a connector for receiving a processor, the connector including a first pin for receiving a feature setting selection signal; and (c) a reset signal line coupled to the first pin, wherein a signal in a first state on the reset signal line denotes a reset state of the motherboard, thereby allowing the motherboard to fail safely, when an incompatible processor is attached to the connector, the incompatible processor conveying the feature setting selection signal in the first state to select an supported second feature setting of the feature.

* * * * *